United States Patent
Oliver et al.

(10) Patent No.: US 6,354,574 B1
(45) Date of Patent: Mar. 12, 2002

(54) LEAF SPRING TIP INSERT

(75) Inventors: James L. Oliver, Orion; Richard F. Pierman, Northville; Venkata Balanethiram, Troy; James W. Mailey, Grand Blanc, all of MI (US)

(73) Assignee: Oxford Suspension, Inc., Troy, MI (US)

( * ) Notice: Subject to any disclaimer, the term of this patent is extended or adjusted under 35 U.S.C. 154(b) by 0 days.

(21) Appl. No.: 09/614,671

(22) Filed: Jul. 12, 2000

(51) Int. Cl.[7] ......................... A44B 17/00; F16B 19/00; B60G 13/00
(52) U.S. Cl. ......................... 267/49; 267/260; 267/269
(58) Field of Search ........................... 267/36.1, 48, 47, 267/49, 53, 260–262, 158, 268, 30, 37.4, 269; 24/297, 115 M, 453; 29/896.91, 896.93

(56) References Cited

U.S. PATENT DOCUMENTS 2,708,111 A * 5/1955 Sturtevant
5,219,151 A * 6/1993 Stewart et al. .............. 267/262
5,542,652 A * 8/1996 Stuart ......................... 267/49
5,706,559 A * 1/1998 Oliver et al.

* cited by examiner

Primary Examiner—Douglas C. Butler
(74) Attorney, Agent, or Firm—Dykema Gossett PLLC

(57) ABSTRACT

A vehicular leaf spring tip insert is provided. The insert includes a pad portion providing a liner between adjacent leaf spring tips, at least one shank portion extending from the pad portion to a free end, the shank portion having a generally axial bore, the shank portion also having a protuberance extending outward therefrom with a leaf spring engagement surface facing toward the pad portion at an axial distance therefrom, the protuberance being dimensionally adapted and configured so that the protuberance is compressed radially inward sufficiently to be received through the tip opening upon insertion of the shank portion therethrough, and a pin for insertion into the shank bore, the pin retaining the shank protuberance in a position to extend the protuberance radially outward to enable the shank leaf spring engagement surface to become engageable with the leaf spring.

30 Claims, 4 Drawing Sheets

LEAF SPRING TIP INSERT

FIELD OF THE INVENTION

The present invention relates generally to the installation and retention of a low friction pad at the ends of the supporting leaves of a vehicular leaf spring to improve ride characteristics and reduce noise and wear between adjacent leaves of a multi-leaf spring assembly during operation of a vehicle.

BACKGROUND OF THE INVENTION

For many years, non-metallic, generally polymeric, tip inserts or separator pads have been used between adjacent vehicular leaf spring plates (or leaves), as a means of reducing friction, noise and wear and improving ride as the plates slide relative to each other when the spring flexes during operation of vehicle. Examples involving the use of leaf spring separator pads at the ends of the leaves which support the main leaf attached to the vehicle chassis may be found In U.S. Pat. Nos. 5,219,151 and 5,706,559. The most common and expedient approach to attachment is to integrally mold a projecting solid or tubular shank or post on the underside of the tip insert pad which is then inserted in a through hole centrally located near the ends or tips of some or all of the supporting leaves and second stage leaves in a multi-leaf spring assembly.

Prior leaf spring tip inserts have been commonly designed following either or both of two approaches. The first has been specification of an intentional interference fit between the diameter of the tip insert post or shank and the diameter of the receiving hole in the spring leaf relying on compression of that polymer shank and resulting radial forces and friction with the surface of the receiving hole in the spring leaf to accomplish tip insert retention. The second and most common means has been to provide some form of an integrally molded radial projection or protuberance near the free end of the tip insert shank which substantially exceeds the diameter of the receiving hole in the spring leaf. Such a tip insert design commonly employs a tubular shank with two or more axial slots through the shank wall to allow inward deflection of the post to accommodate passing of the said shank end projection through the receiving hole in the spring leaf. When the shank is fully inserted in the leaf spring plate the projection extends beyond the lower surface of the spring and overlaps the outer edges of the receiving hole to achieve retention of the tip insert in vehicle service.

It is recognized that it is desirable to provide a tip insert that may be easily installed with minimum force using simple tools, but requires high force to be removed or disengaged once it has been installed in the spring leaf. Generally tip inserts which are the easiest to install provided the least retention to the leaf spring as a result of the lack of sufficient interference fit of the tip insert shank diameter with the receiving hole and/or the amount of overlap of the shank end protuberance with the receiving hole. Increasing the interference fit and/or the overlap of the tip insert shank end protuberance with its receiving hole in the spring leaf has been employed to increase the reliability of tip insert retention, as measured by the force to push the tip insert shank in reverse, back out of the hole in the spring leaf. However, the degree of difficulty and force required to insert the shank through the hole in the spring plate increases greatly in this situation and results in a high level of permanent deformation of the polymer shank and/or the radial protuberance which decreases its ultimate interference and retention capability. As a result, the retention capability and reliability of past tip insert designs has been limited and less than needed to achieve acceptable durability in many vehicle leaf spring applications.

SUMMARY OF THE INVENTION

To fulfill the above-noted and other unmet desires, the revelation of the present invention is brought forth. The present invention provides a leaf spring tip insert which requires high force to be removed from the spring leaf, but can be manually installed relatively easily with simple hand tools. In a preferred embodiment, the present invention provides a leaf spring tip insert that includes a pad portion providing a low friction, wear-resistant separator between adjacent leaf spring tips. Extending from the pad portion is at least one shank portion that has a central bore and a plurality of axial slots starting from a free end of the shank. The shank also has protuberances extending radially outward therefrom with leaf spring engagement surfaces facing toward the pad portion at an axial distance therefrom. The protuberances are dimensionally adapted and configured so that the shank and protuberances are deflected and compressed radially inward sufficiently to be easily passed through a receiving hole in the tip of the spring leaf. The tip insert has a pin of sufficient length to partially or totally fill the shank bore to achieve the desired force for removal. This pin is inserted into the bore of the shank, using a hammer or other suitable means, after the shank has been passed through the receiving hole in the spring leaf. The pin retains the shank protuberances in a position to extend radially outward to overlap the exit edge of the receiving hole in the spring leaf and produces high resistance to their inward deflection and compression to pass back in reverse through the hole in the spring leaf and disengage from the leaf spring. To provide additional ease of installation, the pin is integrally molded with the pad portion and the shank portion of the tip insert. To install the pin, the pin is simply pressed into the underlying bore of the tip insert shank portion using a mallet or other suitable means after the shank portion has been easily inserted through the receiving hole in the leaf spring.

The pin is typically designed to have either or both an interference fit and a mating mechanical locking feature to engage within the shank bore of the tip insert when the pin is inserted into said shank bore to assure retention of the pin in vehicle service and its effectiveness in preventing the shank and protuberances from inward deflection and disengagement of the tip insert from the spring leaf.

It is a desire of the present invention to provide a leaf spring tip insert that has a low force requirement for installation and a high force requirement for removal or disengagement of the insert from the leaf spring.

DETAILED DESCRIPTION OF THE INVENTION

Figure 1:
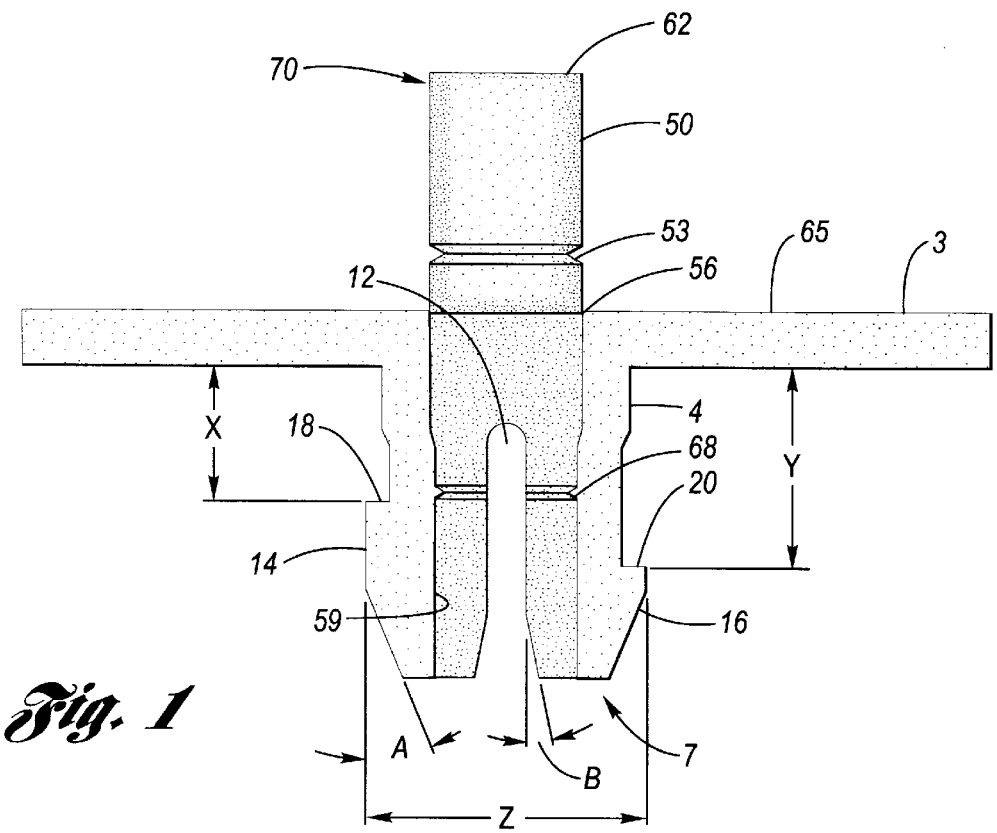
FIG. 1 is a side elevational view of a vehicular leaf spring tip insert illustrating the pad portion, shank portion and pin as they are initially integrally molded together in a preferred embodiment of the present invention.
Figure 3:
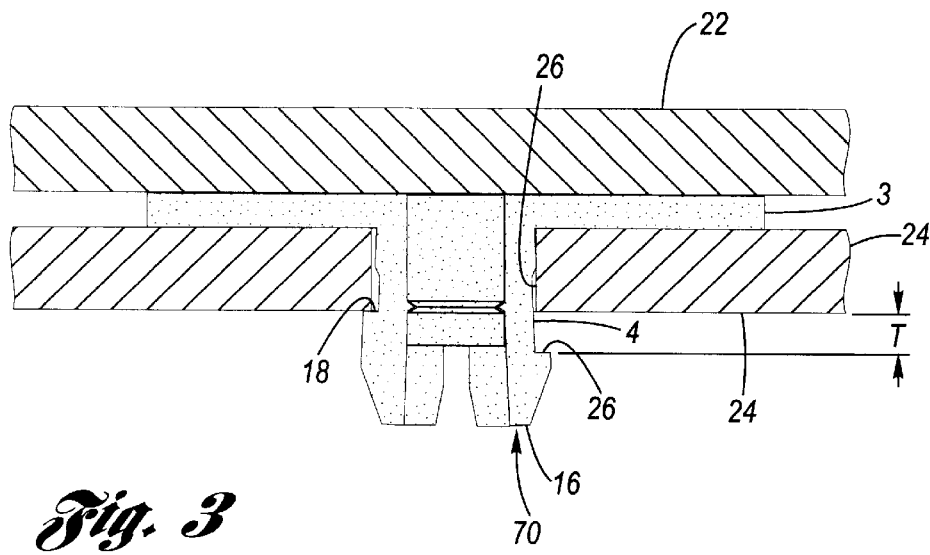
FIG. 3 is a sectional view illustrating the tip insert shown in FIGS. 1 and 2 being installed in a leaf spring assembly.
Figure 4:
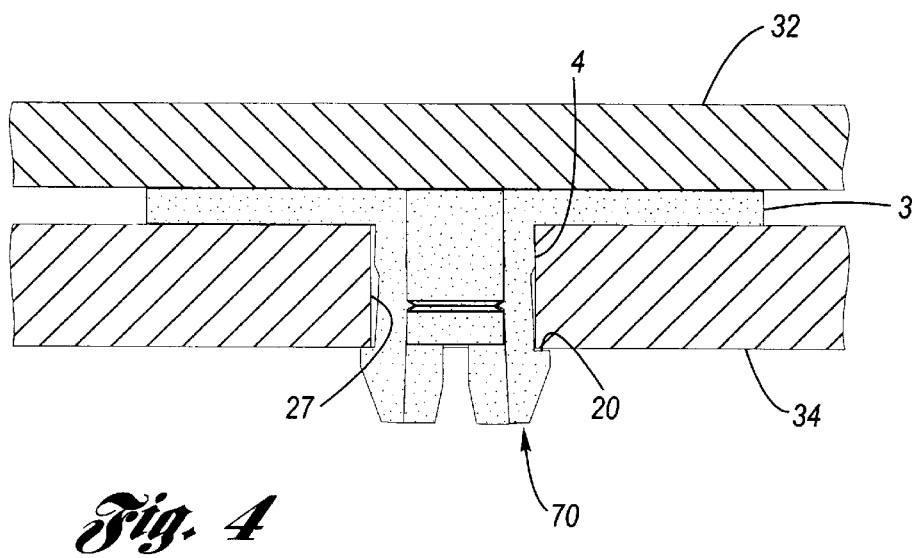
FIG. 4 is a view similar to that of FIG. 3, illustrating the utilization of the tip insert of the present invention being installed in a spring leaf, wherein the supporting spring leaf has a greater thickness dimension than the supporting spring leaf shown in FIG. 3.

In FIG. 1, insert 70 has a pad portion 3 adapted to provide a low friction, wear-resistant separator between leaf spring plate tip ends, as shown in FIGS. 3 and 4. A shank portion 4 extends preferably substantially perpendicular from pad portion 3 to free end 7.

Figure 2:
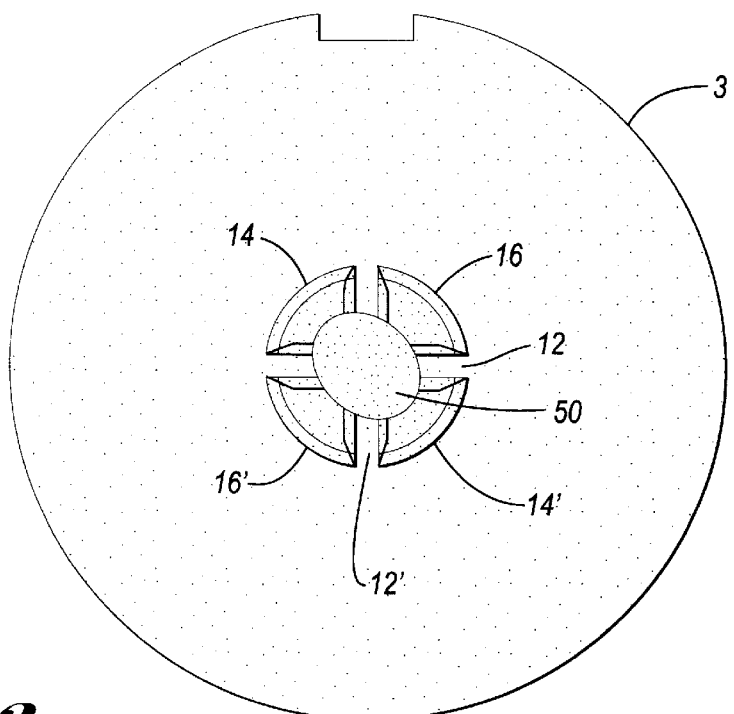
FIG. 2 is a bottom plan view of the spring tip insert shown in FIG. 1.

In the embodiment shown in FIG. 2, orthogonal slots 12 and 12' extend from free end 7 for a prescribed axial distance toward pad portion 3 and divide shaft 4 into four resilient elongated segments having corresponding diametrically-opposed protuberances 14, 14' and 16, 16' that respectively radially extend outward to provide a diametrical width "Z" that, along with the width of slots 12 and 12', is predetermined to enable the segments to radially deflect and compress inward sufficiently to enable them to be received through the leaf spring tip opening into which shaft 4 is inserted. Diametrically-opposed protuberances 14 and 14' have corresponding leaf spring engagement surfaces 18 and 18' that face toward pad portion 3 and are in substantial registration with each other at a prescribed axial distance "X" therefrom. Likewise, diametrically-opposed protuberances 16 and 16' have corresponding arcuate leaf spring engagement surfaces 20 and 20' that face toward pad portion 3 and are in substantial registration with each other at an axial distance "Y" from pad portion 3 that is greater than distance "X."

The difference in axial lengths "X" and "Y" enables insert 70 to be securely attached to spring leaves or plates having a range of thicknesses, as shown in FIGS. 3 and 4

As shank portion 4 is inserted into the leaf spring tip opening, protuberances 14, 14' and 16, 16' are configured to radially compress inward such as by having their respective outer surfaces tapered angularly inward directionally toward free end 7 at an angle "A," for which 20° has been found to be particularly effective in reducing force of inserting/installation.

To enhance compressibility by minimizing interference of converging inner bore and slot surfaces of the shank segments under inward deflection and compression of the shank 4, and protuberances 14, slots 12 and 12' may be flared outward at angle "B" for a prescribed length from free end 7, for which 5–6° from the center line to provide a preferred included angle of about 10–12°, has been found to be particularly effective for a particular design.

In FIG. 3, insert 50 is being utilized to provide a space (pad portion 3) between adjacent leaf spring plates 22 and 24. The thickness of plate 24 (not referenced) is the same or less than length "X" in FIG. 1 such that when shaft portion 4 is inserted through opening 26 of leaf spring plate 24 until the underside of pad portion 3 abuts against plate 24, protuberances 14, 14' and 16, 16' spring or expand outward to enable surfaces 18 and 18' to engage with the underside of spring plate 24 to lockingly secure insert 50 to spring plate 24, while plate engagement surfaces 20 and 20' of protuberances 16 and 16' respectively remain at a prescribed distance "T" away from the underside of spring plate 24.

In FIG. 4, leaf spring plate 34 has a thickness (not referenced) that is greater than length "X" and the same or less than length "Y" in FIG. 1 such that arcuate surfaces 20 and 20' of protuberances 16 and 16' respectively are engaged with the underside of leaf spring plate 34, while protuberances 14 and 14' remain compressed within opening 26.

To extend the protuberances 14, 14', 16, 16' outward and to lockingly retain them in the outward position, there is provided a pin 50. As best shown in FIG. 2, pin 50 has a non-constant radius oval cross-sectional shape. The pin 50 is integrally molded with the pad 3 and shank 4. Common materials utilized for such a molding are high density polyethylene with graphite additive for friction and wear reduction or nylon 6-6 with teflon additive for the same purpose, while other suitable material alternatives may be used for this application. As shown in FIGS. 1–3, pin 50 has an annular groove 53. At the intersection 56 of the two portions of tip insert 70, pin 50 is held to pad 3 by a thin webbing material. Underneath pin 50, the shank 4 has an interior axial bore 59. The shank bore 59 typically will have a cross-sectional geometry approximately matching that of the pin 50. To install the tip insert 70 into the spring assembly provided by the leaf springs 22, 24 or 32, 34, the tip insert shank 4 is inserted through the leaf spring receiving hole 27. After insertion of the shank, the protuberances 14, 14' or 16, 16' will radially expand approximately to their as-molded position so that their leaf spring engagement surfaces 18, 18' or 20, 20' may engage with the adjacent leaf springs. A hammer, mallet or other simple impact tool is then utilized to impart a force onto the upper surface 62 of the pin. In the embodiment having an integrally molded rather than separate pin, the force upon the upper surface 62 of the pin will cause the material at intersection 56 to be sheared and for the pin 50 to be thrust downward into the bore 59 of the shank. When fully assembled, the top surface 62 of the pin will be flush with a top surface 65 of the pad portion. The oval shape of the pin 50 prevents it from rotating within the bore 59 and thereby holds it more securely in position. Additionally, the bore of the shank has an inward projecting radial ledge 68. The ledge 68 interlocks into the radial groove 53 of the pin to retain pin 50 in position. As will be obvious to those skilled in the art, the pin 50 prevents the protuberances 14, 14', 16, or 16' from deflecting inward thereby locking them to the adjacent leaf spring 24 or 34.

Figure 3A:
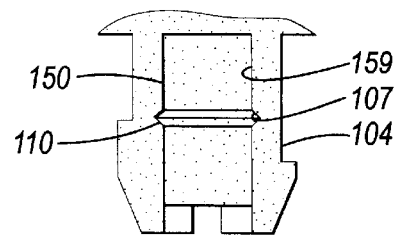
FIG. 3a is a partial sectional view of a spring tip insert similar to that shown in FIG. 3, wherein the groove and ledge interconnect between the pin and an interior axial bore of the shank has the groove in the bore of the shank instead of in the pin as shown in FIG. 3.

In the embodiment of the present invention shown in FIG. 3a, a shank 104 has a bore 159 with a groove 107. The groove 107 is mated with a ledge 110 of a pin 50.

Figures 5A, 5B, 5C, 5D:
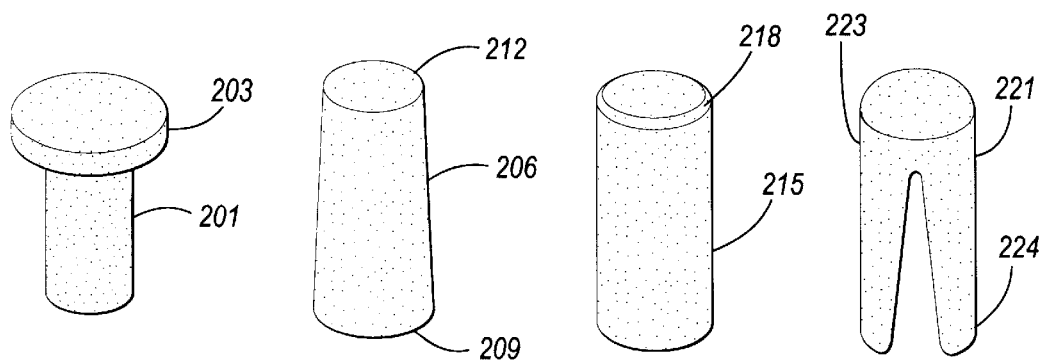
FIG. 5a illustrates an alternate preferred embodiment pin with a head.
FIG. 5b illustrates an alternate preferred embodiment pin, wherein the pin is tapered.
FIG. 5c illustrates an alternate preferred embodiment pin with a tapered lead.
FIG. 5d illustrates an alternate preferred embodiment hair pin configuration with a main body with extending legs.

FIG. 5a provides an alternate preferred embodiment pin 201 according to the present invention with a head 203 which is designed to be flush or slightly above the upper/outer surface of the pad when the pin is fully inserted in the shank bore.

Referring to FIG. 5b, a tapered pin 206 is shown having a large diameter end 209 and a small diameter end 212. Typically, the end 212 will be inserted into the bore 59 from the side of the tip insert more adjacent to the pad. The taper of pin 206 aids in insertion of the pin while achieving high interference fit to increase the force required for its removal.

FIG. 5c illustrates a pin 215 which has a tapered lead 218. Tapered lead 218 aids in insertion of the pin 215. Pin 215 may be circular or have a non-constant radius cross-section such as an oval.

FIG. 5d illustrates a hairpin-type pin 221 having a main body 223 with extending legs 224. Legs 24 are sized to be radially compressed upon insertion into the shank bore.

Figures 5E, 5F, 5G, 5H:
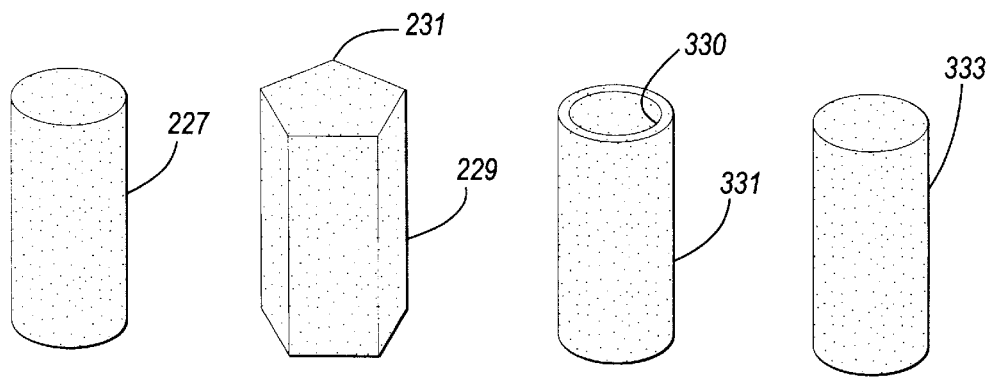
FIG. 5e illustrates an alternate preferred embodiment pin, wherein the pin has a circular cross-section.
FIG. 5f illustrates an alternate preferred embodiment pin, wherein the pin is multi-faceted.
FIG. 5g illustrates an alternate preferred embodiment pin, wherein the pin is hollow.
FIG. 5h illustrates an alternate preferred embodiment pin, wherein the pin is oval.

FIG. 5e illustrates an alternate preferred embodiment simple cylindrical separate pin 227 which provides the advantage of its ease of manufacture.

FIG. 5f illustrates an alternate preferred embodiment pin 229 having multiple facets 231 which engage into the sides of the shank bore to produce multiple line interference fit to retain the pin 229 within the shank bore.

FIG. 5g illustrates an alternate preferred embodiment pin 331 which has a central bore 330 to allow the pin 331 to slightly collapse upon insertion to allow insertion with a high interference fit within the bore of the shank.

FIG. 5h is an alternate embodiment pin 333 having an oval cross-sectional shape without the circumferential grooves as shown in FIGS. 1–3.

Figures 5I, 5J, 5K, 5L:
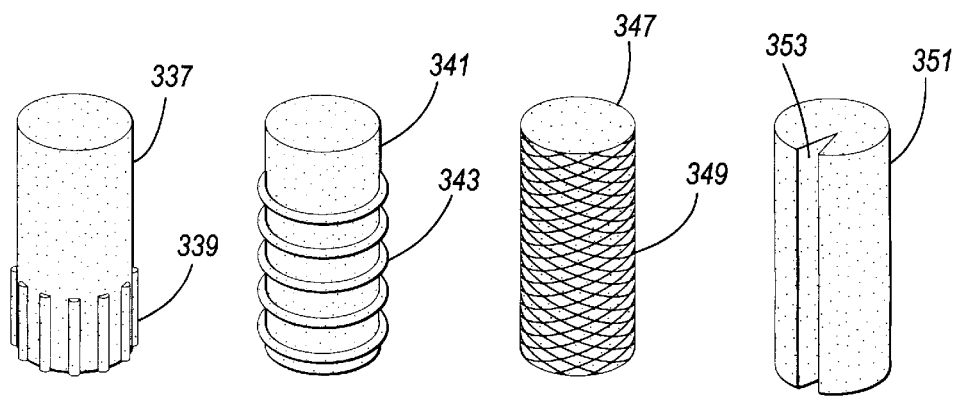
FIG. 5i illustrates an alternate preferred embodiment pin, wherein the pin has axial ribs.
FIG. 5j illustrates an alternate preferred embodiment pin, wherein the pin has radial ribs.
FIG. 5k illustrates an alternate preferred embodiment pin, wherein the pin has a geometric patterned surface.
FIG. 5l illustrates an alternate preferred embodiment pin, wherein the pin has an axial slot.

FIG. 5i shows yet another alternate preferred embodiment of the present invention providing a pin 337 with a plurality of generally axial ribs 339 along its lower end. As will be apparent to those skilled in the art, the number, axial location, and length of the ribs 339 may be modified in light of the application utilized to produce the desired interference for retention of the pin.

FIG. 5j shows another alternate preferred embodiment pin 341 which has a plurality of axially-spaced circumferential or radial ribs 343 to produce multiple line interference fit.

FIG. 5k illustrates an alternate preferred embodiment pin 347 having a geometrically patterned surface 349 to produce multiple line interference fit.

FIG. 5l illustrates an alternative preferred embodiment pin 351 having an axial angular slot 353 which is compressed upon insertion into a shank bore to insure the interference fit of the pin 351 within the shank bore is retained through the radial residual force of a high interference fit.

Figure 6:
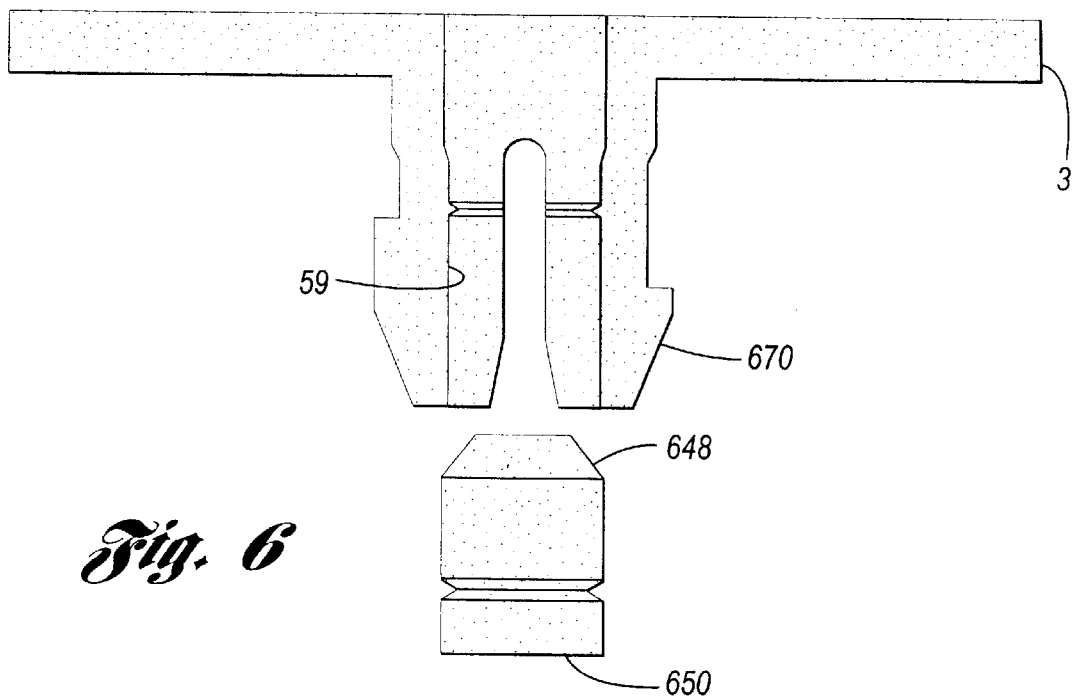
FIG. 6 is an alternate preferred embodiment wherein the pin is inserted into the tip insert shank on a side of the shank opposite the pad.

FIG. 6 illustrates an alternative preferred embodiment 670 tip insert according to the present invention wherein the pin 650 is installed into the bore 59 of the tip insert 670 opposite the pad 3. The pin 650 has a tapered head 648 to assist in its installation. The pin 650 may be a separate piece or a piece that is connected to the remainder of the tip insert 670 by a thin webbing which can be severed.

It is apparent to those skilled in the art that as the pin has been shown in various embodiments, in a similar manner the interior bore of the shank may also be modified in order to bring about an interference interface between the pin and the shank interior bore which aids in retention of the pin within the bore. Additionally, the pin may be inserted into the shank from the free end of the shank 4 opposite the pad.

In another embodiment of the present invention (not shown), an adhesive is pre-applied to the pin or within the shank bore to aid in retention of the pin.

The present inventive leaf spring tip insert has been shown in various preferred embodiments. However, it will be apparent to those skilled in the art that various modifications can be made to the present invention from that described in the specification and drawings without departing from the spirit or scope of the present invention as it is encompassed in the specification and drawings and by the following claims.

We claim:

1. A vehicular leaf spring tip insert, said insert comprising:
   a pad portion providing a liner between adjacent leaf spring tips;
   at least one shank portion extending from said pad portion to a free end, said shank portion having a generally axial bore, said shank portion also having a protuberance extending outward therefrom with a leaf spring engagement surface facing toward said pad portion at an axial distance therefrom, said protuberance being dimensionally adapted and configured so that said protuberance is compressed radially inward sufficiently to be received through the tip opening upon insertion of said shank portion therethrough; and
   a pin for insertion into said shank bore, said pin retaining said shank protuberance in a position to extend said protuberance radially outward to enable said shank leaf spring engagement surface to become engageable with said leaf spring.

2. A vehicular leaf spring tip insert as described in claim 1, wherein said shank has an axial slot starting from said shank free end.

3. A vehicular leaf spring insert as described in claim 2, where there is a plurality of axial slots and a plurality of protuberances.

4. A vehicular leaf spring tip insert as described in claim 3, having at least four axial slots and wherein there are at least two protuberances having leaf engagement surfaces at a first axial length and wherein there are at least two other protuberances having leaf engagement surfaces at a second axial length differing from said first axial length.

5. A vehicular leaf spring tip insert as described in claim 1, wherein said pin is integrally molded with said pad and said shank portion of said insert.

6. A vehicular leaf spring tip insert as described in claim 1, wherein said pin is inserted into said bore of said shank from a side of said shank generally adjacent to said pad.

7. A vehicular leaf spring tip insert as described in claim 1, wherein said pin is inserted into said bore of said shank from a side of said shank generally opposite said pad.

8. A vehicular leaf spring tip insert as described in claim 1, wherein said pin has an interference fit within said shank bore when said pin is inserted in said shank bore after said shank is installed in the receiving hole in the spring leaf end.

9. A vehicular leaf spring tip insert as described in claim 1 wherein said pin has interlocking engagement with said bore of said shank.

10. A vehicular leaf spring tip insert as described in claim 9, wherein said pin has a radial groove and said bore of said shank has a ledge for engagement with said pin radial groove.

11. A vehicular leaf spring tip insert as described in claim 9, wherein said shank bore has a radial groove and said pin has a ledge for engagement with said groove of said shank bore.

12. A vehicular leaf spring tip insert as described in claim 1, wherein said pin has an interference fit within said bore of said shank.

13. A vehicular leaf spring tip insert as described in claim 1, wherein said pin and said bore of said shank have a non-constant radius.

14. A vehicular leaf spring tip insert as described in claim 1, wherein said pin has a head.

15. A vehicular leaf spring tip insert as described in claim 1, wherein said pin has a tapered lead.

16. A vehicular leaf spring tip insert as described in claim 1, wherein said pin has a tapered body.

17. A vehicular leaf spring tip insert as described in claim 1, wherein said pin has a hairpin configuration with a main body and extending legs.

18. A vehicular leaf spring tip insert as described in claim 1, wherein said pin is multi-faceted.

19. A vehicular leaf spring tip insert as described in claim 1, wherein said pin and said shank bore are shaped generally as an oval.

20. A vehicular leaf spring tip insert as described in claim 1, wherein said pin is hollow.

21. A vehicular leaf spring tip insert as described in claim 1, wherein said pin has at least one axial rib.

22. A vehicular leaf spring tip inserted as described in claim 21, wherein said pin has a plurality of axial ribs.

23. A vehicular leaf spring tip insert as described in claim 1, wherein said pin has at least one radial rib.

24. A vehicular leaf spring tip insert as described in claim 23, wherein said pin has a plurality of radial ribs.

25. A vehicular leaf spring tip insert as described in claim 1, wherein said pin has a patterned surface.

26. A vehicular leaf spring tip insert as described in claim 1, wherein said pin has an axial slot.

27. A vehicular leaf spring tip insert as described in claim 1, wherein said pin is integrally molded with said pad and said shank.

28. A vehicular leaf spring tip insert, said insert comprising:

a pad portion providing a liner between adjacent leaf spring tips;

at least one shank portion extending from said pad portion to a free end, said shank portion having a plurality of axial slots starting from said shank free end, said shank portion having a generally axial non-constant radius cross-sectional bore, said shank portion also having protuberances extending outward therefrom with leaf spring engagement surfaces facing toward said pad portion at an axial distance therefrom, said protuberances being dimensionally adapted and configured so that said protuberances are compressed radially inward sufficiently to be received through the tip opening upon insertion of said shank portion therethrough; and a pin for insertion into said shank portion bore, said pin having an interference fit within said shank bore when said shank is inserted in the tip opening, said pin retaining said shank protuberances in a position to extend said protuberance radially outward to enable said shank leaf spring engagement surface to become engageable with said leaf spring and said pin being integrally molded with said pad portion and said shank portion.

29. A vehicular leaf spring tip insert, said insert comprising:

a pad portion providing a liner between adjacent leaf spring tips;

at least one shank portion extending from said pad portion to a free end, said shank portion having a plurality of axial slots starting from said shank free end, said shank portion having a generally axial bore, said shank also having protuberances extending outward therefrom with leaf spring engagement surfaces facing toward said pad portion at an axial distance therefrom, said protuberances being dimensionally adapted and configured so that said protuberances are compressed radially inward sufficiently to be received through the tip opening upon insertion of said shank portion therethrough; and a pin for insertion into said shank bore, said pin retaining said shank protuberances in a position to extend said protuberances radially outward to enable said shank leaf spring engagement surfaces to become engageable with said leaf spring, said pin being insertable into said shank bore from a side of said shank generally adjacent to said pad and said pin having an interlocking relationship with said shank bore.

30. A vehicular suspension leaf spring assembly comprising:

at least a first spring leaf;

at least a second spring leaf adjacent the first spring leaf;

said second spring leaf having an opening and a vehicular leaf spring tip insert, said insert including:

a pad portion providing a liner between adjacent spring leaf tips;

at least one shank portion extending from said pad portion to a free end, said shank portion having a generally axial bore, said shank portion also having a protuberance extending outward therefrom with a leaf spring engagement surface facing toward said pad portion at an axial distance therefrom, said protuberance being dimensionally adapted and configured so that said protuberance is compressed radially inward sufficiently to be received through the tip opening upon insertion of said shank portion therethrough; and a pin for insertion into said shank bore, said pin retaining said shank protuberance in a position to extend said protuberance radially outward to enable said shank leaf spring engagement surface to become engageable with said leaf spring.

* * * * *